US006942166B2

United States Patent
Tanimoto

(10) Patent No.: US 6,942,166 B2
(45) Date of Patent: Sep. 13, 2005

(54) SPRINKLER PIPELINE ASSEMBLY AND RELATED SPRINKLER

(76) Inventor: Atsushi Tanimoto, 859-2, Fuke Ko, Kokubunji-cho, Ayauta-gun, Kagawa Prefecture (JP)

(*) Notice: Subject to any disclaimer, the term of this patent is extended or adjusted under 35 U.S.C. 154(b) by 0 days.

(21) Appl. No.: 10/070,654
(22) PCT Filed: Oct. 19, 2001
(86) PCT No.: PCT/JP01/09227
§ 371 (c)(1), (2), (4) Date: Dec. 9, 2003
(87) PCT Pub. No.: WO03/034810
PCT Pub. Date: May 1, 2003

(65) Prior Publication Data
US 2004/0089748 A1 May 13, 2004

(51) Int. Cl.$^7$ .............................................. B05B 15/00
(52) U.S. Cl. ...................... 239/547; 239/542; 239/550; 239/566; 285/305
(58) Field of Search ................................ 239/542, 548, 239/550, 203, 204, 505, 513, 521, 566, 565; 169/5, 16, 37; 138/120; 285/330, 913, 914, 305, 316, 317

(56) References Cited
U.S. PATENT DOCUMENTS

| | | | | |
|---|---|---|---|---|
| 1,260,690 A | * | 3/1918 | Liady .......................... 285/330 |
| 2,195,492 A | * | 4/1940 | McDonald .................. 285/330 |
| 3,283,780 A | * | 11/1966 | Sutton .................... 137/614.04 |
| 5,188,399 A | * | 2/1993 | Durina ......................... 285/91 |
| 5,441,202 A | * | 8/1995 | Wintering et al. .......... 239/267 |
| 5,813,705 A | * | 9/1998 | Dole .......................... 285/321 |

* cited by examiner

Primary Examiner—David A. Scherbel
Assistant Examiner—Seth Barney
(74) Attorney, Agent, or Firm—Arent Fox, PLLC.

(57) ABSTRACT

A sprinkler to sprinkle water running in a pipeline over both its sides through sprinkler heads mounted on the pipeline, wherein (i) the pipeline comprises first water pipes and second water pipes connected to each other alternately so as to be freely disconnectable and reconnectable, (ii) both end portions of each first water pipe are formed so as to have outer diameter which is equal to the inner diameter of the second water pipes, (iii) a plurality of first engaging protrusions are formed on the periphery of one end portion of each first water pipe, at regular angular intervals around the longitudinal center axis of said first water pipe, and (iv) a plurality of second engaging protrusions are formed at one end of each second water pipe so as to engage with the first engaging protrusions of the first water pipe when the end portion with first engaging protrusions of a first water pipe is inserted into the end with second engaging protrusions of said second water pipe.

4 Claims, 6 Drawing Sheets (A)

(B)

(A)

(B)

(C)

(A)

Engaging part (B)

(A)

(B)

(C)

(A)

(B)

SPRINKLER PIPELINE ASSEMBLY AND RELATED SPRINKLER

BACKGROUND OF THE INVENTION

The present invention relates to a sprinkler.

Sprinklers are used in orchards to water fruit trees. A number of sprinklers are installed in an orchard to water all its fruit trees.

In case of an orchard lying on a slope of a hill, a large number of fruit trees vegetate extensively, requiring many sprinklers. The initial investment for them is costly and their installation is laborious.

Introduced in recent years to solve the above problems has been a sprinkler shown in FIG. 6, which is constructed by laying and connecting pipes of vinyl chloride on the ground between fruit trees and fitting the pipeline with a plurality of sprinkler heads.

As shown in FIG. 6, through holes 100h are made in the top portion of the wall of each pipe and a nozzle is set in each through hole 100h. Each nozzle comprises a cylindrical part 111 and an axial part 112 inserted in the cylindrical part 111. A through hole 111h is made in the side wall of the cylindrical part 111. A gap to let water through is provided between the inner surface of the cylindrical part 111 and the outer surface of the axial portion 112a of the axial part 112.

Accordingly, when water is allowed to run through the pipeline, the water flows into the cylindrical part 111 through its through hole 111h of each nozzle, flows further through the gap between the inner surface of the cylindrical part 111 and the outer surface of the axial portion 112a of the axial part 112, and spouts out from the gap 110s between the head of the cylindrical part 111 and the head 112b of the axial part 112. Thus, the water running in the pipeline is fed to nearby fruit trees.

Because the pipes 100 of the above sprinkler are fixed on the ground, nozzles 110 cannot be redirected to desired fruit trees. Accordingly, water is fed to nearby fruit trees by sprinkling water in all directions from each nozzle. In this case, however, water is fed not only to places where fruit trees is planted but also to places where no fruit trees are planted. Thus, water is sprinkled inefficiently.

On the other hand, it is desirable to sprinkle water on the whole of a grown-up fruit tree, whereas it is desirable to feed water mainly to the root area of a nursery tree. Besides, the quantity of water required by a nursery tree and that required by a grown-up tree are different from each other; therefore, as a fruit tree grows, the quantity of water to be fed and the place to be fed with water have to be adjusted. In the case of the above sprinkler, places to be fed with water are adjusted by adjusting the water pressure in the pipeline and gaps 110s. Such adjustment is difficult; therefore, it is difficult to feed desired places with water.

If individual pipes can be turned around their respective longitudinal axial centers, places to be fed with water can easily be adjusted. However, pipes are fixedly connected to each other with adhesive or other means. If some pipes are to be turned, they have to be disconnected from their immediately upstream and downstream pipes, which is laborious. If pipes are connected to each other so as to be easily disconnectable from each other, relative turning at the connections between pipes cannot be prevented completely. Accordingly, while water is being sprinkled, pipes turns, changing the directions of sprinkler heads and, thereby, shifting the places where sprinkled water lands. Under the circumstances, a method of adjusting places to be sprinkled with water has not been developed yet.

SUMMARY OF THE INVENTION

According to the first feature of the present invention, there is provided a sprinkler to sprinkle water running in a pipeline over both its sides through sprinkler heads mounted on the pipeline. The pipeline comprises first water pipes and second water pipes connected to each other alternately so as to be freely disconnectable and reconnectable. Both end portions of each first water pipe are formed so as to have outer diameter which is equal to the inner diameter of the second water pipes. A plurality of first engaging protrusions are formed on the periphery of one end portion of each first water pipe, at regular angular intervals around the longitudinal center axis of said first water pipe. A plurality of second engaging protrusions are formed at one end of each second water pipe so as to engage with the first engaging protrusions of the first water pipe when the end portion with first engaging protrusions of a first water pipe is inserted into the end with second engaging protrusions of said second water pipe.

According to the second feature of the present invention, there is provided the sprinkler of claim 1, wherein each first water pipe in the pipeline is movable along its longitudinal center axis. When each first water pipe in the pipeline is moved toward the connection where the end portion without first engaging protrusions of said first water pipe is inserted into the end without second engaging protrusions of a second water pipe, the engagement between the first engaging protrusions of said first water pipe and the second engaging protrusions of a second water pipe at the other connection is broken.

According to the third feature of the present invention, there is provided a sprinkler to sprinkle water running in a pipeline over both its sides through sprinkler heads mounted on the pipeline. The pipeline comprises first water pipes and second water pipes connected to each other alternately so as to be freely disconnectable and reconnectable. Both end portions of each first water pipe are formed so as to have outer diameter which is equal to the inner diameter of the second water pipes. At least one end portion of each first water pipe is provided with a plurality of engaging parts which are disposed in the periphery of the end portion, at regular angular intervals around the longitudinal center axis of said first water pipe and free to protrude beyond and withdraw under the level of the outer surface of the end portion. At least one end portion of each second water pipe is provided with engaging recesses in the inner surface of the end portion which engage with the engaging parts of a first water pipe.

According to the fourth feature of the present invention, there is provided the sprinkler of claim 3, wherein each engaging recess in the inner surface of said end portion of each second water pipe is continued, in the circumferential direction of the inner surface, smoothly to the inner surface.

According to the fifth feature of the present invention, there is provided the sprinkler of claim 1, wherein each of the sprinkler heads of each of the first and second water pipes comprises (i) a groove-like through hole made in the wall of said water pipe, in the circumferential direction of said water pipe, at an appropriate place on said water pipe and (ii) a head unit to sprinkle the water in the pipeline. The head unit of each sprinkler head of each of the first and second water pipes comprises (i) an outer cover which is fitted onto said water pipe to cover the groove-like through whole of said sprinkler head and slidable along the periphery of said water pipe, in the circumferential direction of said water pipe and (ii) a nozzle whose lower end is inserted in the groove-like through whole and whose upper end is fixed to the outer cover. When water is allowed to run through the pipeline, the water is sprinkled from the upper ends of the nozzles.

According to the sixth feature of the present invention, there is provided the sprinkler of claim 3, wherein each of the sprinkler heads of each of the first and second water pipes comprises (i) a groove-like through hole made in the wall of said water pipe, in the circumferential direction of said water pipe, at an appropriate place on said water pipe and (ii) a head unit to sprinkle the water in the pipeline. The head unit of each sprinkler head of each of the first and second water pipes comprises (i) an outer cover which is fitted onto said water pipe to cover the groove-like through whole of said sprinkler head and slidable along the periphery of said water pipe, in the circumferential direction of said water pipe and (ii) a nozzle whose lower end is inserted in the groove-like through whole and whose upper end is fixed to the outer cover. When water is allowed to run through the pipeline, the water is sprinkled from the upper ends of the nozzles.

The advantages offered by the first feature of this invention are as follows. Because sprinkler heads can be directed to fruit trees in want of water by turning first and second water pipes, water can exactly be fed to desired fruit trees and, hence, water can be sprinkled efficiently. Besides, the first and second water pipes are prevented from turning relatively to each other by engaging the first engaging protrusions of first water pipes and the second engaging protrusions of second water pipes with each other after directing sprinkler heads in desired directions. Thus, while water is being sprinkled, the directions of sprinkler heads are not disturbed.

The advantage offered by the second feature of this invention is as follows. The engagement between the first engaging protrusions of a first water pipe and the second engaging protrusions of a second water pipe connected to the first water pipe can be broken by moving the first water pipe along its longitudinal center axis toward its end portion without first engaging protrusions so that the first and second water pipes can be turned relatively to each other; therefore sprinkler heads can easily be redirected without disconnecting first and second water pipes. Thus, the places to be sprinkled with water by sprinkler heads can easily be adjusted.

The advantages offered by the third feature of this invention are as follows. Because sprinkler heads can be directed to fruit trees in want of water by turning first and second water pipes, water can exactly be fed to desired fruit trees and, hence, water can be sprinkled efficiently. Besides, the first and second water pipes are prevented from turning relatively to each other by engaging the engaging parts of first water pipes and the engaging recesses of second water pipes with each other after directing sprinkler heads in desired directions. Thus, while water is being sprinkled, the directions of sprinkler heads are not disturbed.

The advantage offered by the fourth feature of this invention is as follows. Each water pipe in the pipeline can be turned around its longitudinal center axis by applying relatively small torque without disconnecting it from the adjoining water pipes because each of the engaging parts concerned moves smoothly from an engaging recess to the next one. Thus, the places to be sprinkled with water by sprinkler heads can easily be adjusted without disconnecting first and second water pipes.

The advantage offered by the fifth feature of this invention is as follows. The nozzle of each sprinkler head of each water pipe can be move in and along the groove-like through whole of said sprinkler head, the lower end of the nozzle kept in the groove-like through whole, by moving the outer cover of said sprinkler head in the circumferential direction of said water pipe. Accordingly, water from the upper end of the nozzle of each sprinkler head can be fed to desired fruit trees or places just by moving the outer cover of said sprinkler head. Thus, the places to be sprinkled with water by sprinkler heads can easily be adjusted.

The advantage offered by the sixth feature of this invention is as follows. The nozzle of each sprinkler head of each water pipe can be move in and along the groove-like through whole of said sprinkler head, the lower end of the nozzle kept in the groove-like through whole, by moving the outer cover of said sprinkler head in the circumferential direction of said water pipe. Accordingly, water from the upper end of the nozzle of each sprinkler head can be fed to desired fruit trees or places just by moving the outer cover of said sprinkler head. Thus, the places to be sprinkled with water by sprinkler heads can easily be adjusted.

BRIEF DESCRIPTION OF THE DRAWINGS

The features and advantages of the present invention will become more clearly appreciated from the following description in conjunction with the accompanying drawings, in which.

DETAILED DESCRIPTION OF THE PREFERRED EMBODIMENTS

Figure 1:
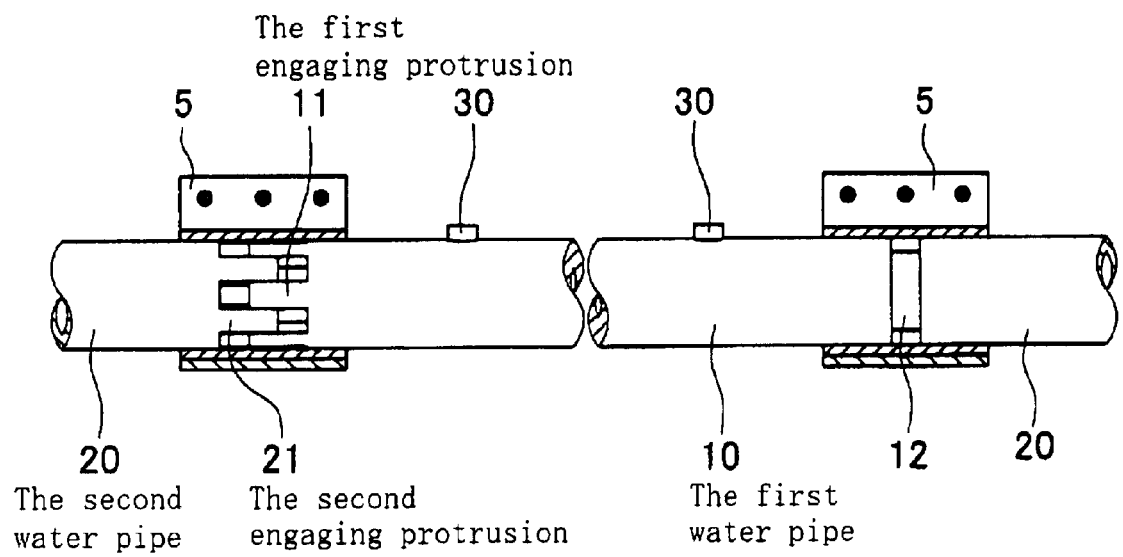
FIG. 1(A) is a schematic illustration of an embodiment of sprinkler of the present invention and FIG. 1(B) is a schematic longitudinal sectional view of the connection between a first water pipe and a second water pipe of FIG. 1(A)
Figure 1:
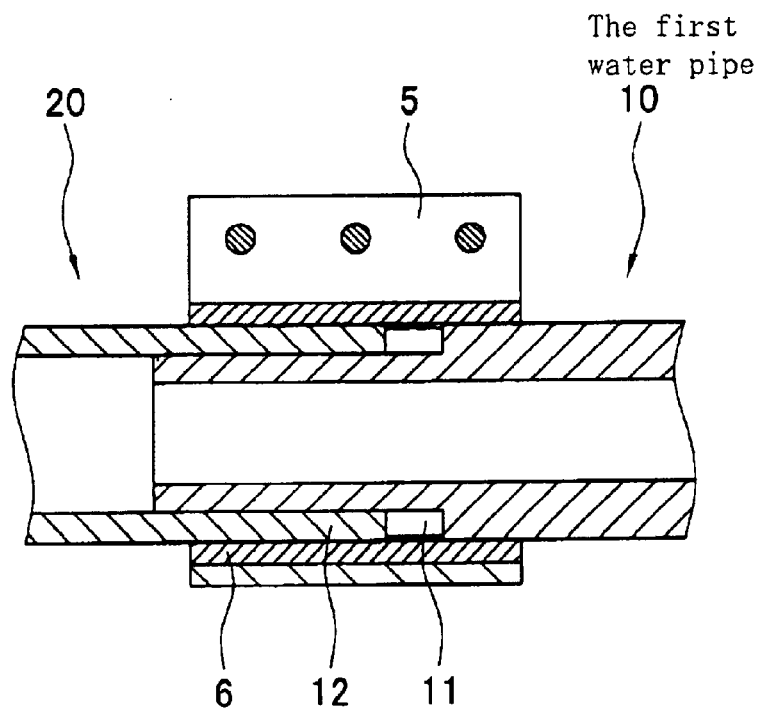

Referring to the drawings, a preferred embodiment of sprinkler of the present invention will now be described.

The sprinkler is to sprinkle water over fruits trees, flowers, and vegetables of orchards lying on the slopes of hills and kitchen gardens and those raised by advanced gardening (forcing, late raising or retarding culture, etc.).

Figure 2:
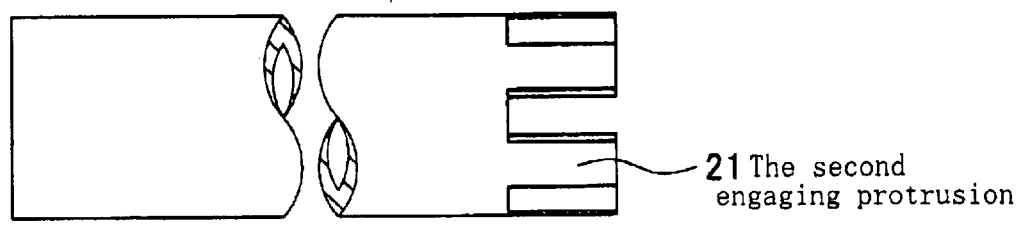
FIG. 2(A) is a side view of a second water pipe of FIG. 1.
FIG. 2(B) is a side view of a first water pipe of FIG. 1.
FIG. 2(C) is an illustration of how to connect the first and second water pipes of FIGS. 2(A) and 2(B) to each other.
Figure 2:
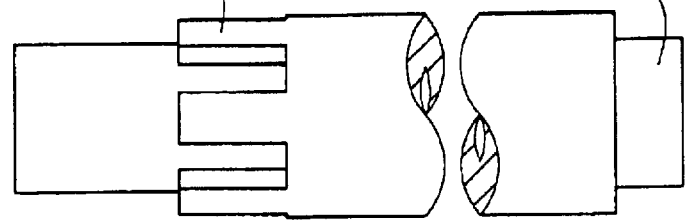
Figure 2:
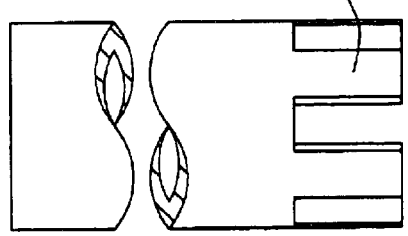

As shown in FIGS. 1 and 2, the sprinkler comprises first water pipes 10 and second water pipes 20 connected alternately. Each of the first water pipes 10 and the second water pipes 20 is provided on its periphery with a plurality of sprinkler heads 30.

Accordingly, while water is running through a pipeline consisting of first water pipes 10 and second water pipes 20, the sprinkler heads 30 sprinkle the water.

The details of the first and second water pipes 10 and 20 will be described below.

As shown in FIGS. 1 and 2, each first water pipe 10 is cylindrical in shape and both its end portions 12 and 12 are reduced in outer diameter. The outer diameter of both the end portions 12 and 12 of each first water pipe 10 is equal to the inner diameter of the second water pipes 20. A plurality of first engaging protrusions 11 are formed on the periphery of one end portion 12 of each first water pipe 10 so as to extend from the root halfway toward the front end of the end portion 12 as shown in FIGS. 2(B) and 2(C). The engaging protrusions 11 on one end portion 12 of each first water pipe 10 are arranged at regular angular intervals around the longitudinal center axis of said first water pipe 10.

Each second water pipe 20 is cylindrical in shape and a plurality of second engaging protrusions 21 are formed at one end of said second water pipe 20. The engaging protrusions 21 on one end of each second water pipe 20 are arranged at regular angular intervals around the longitudinal center axis of said second water pipe 20. The regular angular intervals of the first engaging protrusions 11 of the first water pipes 10 are equal to those of the second engaging protrusions 21 of the second water pipes 20.

Accordingly, when the end with first engaging protrusions 11 of a first water pipe 10 is connected to the end with second engaging protrusions 21 of a second water pipe 20, the first engaging protrusions 11 and the second engaging protrusions 21 engage with each other. Thus, the first water pipe 10 and the second water pipe 20 are prevented from turning relatively to each other.

The angular intervals of the first engaging protrusions 11 of the first water pipes 10 and those of the second engaging protrusions 21 of the second water pipes 20 need not be regular. They may be irregular so long as (i) the first and second engaging protrusions 11 and 12 can engage with each other so as to prevent the first and second water pipes 10 and 20 from turning relatively to each other when the ends with first engaging protrusions 11 of the first water pipes 10 and the ends with second engaging protrusions 21 of the second water pipes 20 are connected to each other and (ii) the first and second engaging protrusions 11 and 12 can again engage with each other so as to prevent the first and second water pipes 10 and 20 from turning relatively to each other after first and second water pipes 10 and 20 are turned relatively to each other for optimal water-sprinkling directions.

The operation and effect of the sprinkler will now be described.

To lay the sprinkler, first and second water pipes 10 and 20 are first placed alternately, bringing the end with first engaging protrusions 11 of each first water pipe 10 to the end with second engaging protrusions 21 of a second water pipe 20, and adjusted so as to put their sprinkler heads 30 in desired directions. Then, the first and second water pipes 10 and 20 are connected at each connection by inserting the end of the first water pipe 10 into the end of the second water pipe 20.

The end portion 12 without first engaging protrusions 11 of each first water pipe 10 is not fully inserted into the corresponding end without second engaging protrusions 21 of the corresponding second water pipe 20 as shown in FIG. 1(A) so that said first water pipe 10 can be moved toward the corresponding end without second engaging protrusions 21 of the corresponding second water pipe 20 and, thereby, the first engaging protrusions 11 of the other end portion 12 of said first water pipe 10 can be disengaged from the second engaging protrusions 21 of the corresponding end of the corresponding second water pipe 20.

Then, each connection is secured by a cramp 5. Thus, the first and second water pipes 10 and 20 are fixed and prevented from moving along or turning around their longitudinal center axis. At each connection, rubber packing 6 is applied between the cramp 5 and the pipes 10 and 20; therefore, the first and second water pipes 10 and 20 are securely held by the cramps 5 and water leak from the connections is prevented.

When water is allowed to run through the pipeline, the sprinkler heads 30 sprinkle the water exactly over the desired fruit trees or places because the former are directed to the latter.

Besides, because the first and second engaging protrusions 11 and 21 of the first and second water pipes 10 and 20 are engaged with each other, the first and second water pipes 10 and 20 are prevented from turning relatively to each other while water is being sprinkled. Thus, the directions of the sprinkler heads 30 are not disturbed.

The place to be sprinkled with water by a section of the pipeline, which consists of a first water pipe 10 and a second water pipe 20 and has a connection at its middle by the first and second engaging protrusions 11 and 21 of the pipes 10 and 20, can be adjusted as follows.

The water of the pipeline is turned off, and the cramps 5 at both the ends and the middle of the section are loosened. Then, the first and second pipes 10 and 20 are moved along their longitudinal center axis, away from each other so as to disengage the first and second engaging protrusions 11 and 21 from each other.

Accordingly, the sprinkler heads 30 can be redirected to desired fruit trees or places by turning the first and second pipes 10 and 20.

After adjusting the directions of sprinkler heads 30, the pipes 10 and 20 are moved along their longitudinal center axis, toward each other so as to engage the first and second engaging protrusions 11 and 21 with each other. Then, the cramps 5 are again tightened to fix the first and second water pipes 10 and 20 and, thereby, prevent them from moving along, or turning around, their longitudinal center axis.

As described above, sprinkler heads 30 can be redirected to desired directions without disconnecting first and second water pipes 10 and 20. Thus, the places to be sprinkled with water by sprinkler heads 30 can easily be adjusted.

Now another, embodiment of sprinkler of the present invention will be described.

Figure 3:
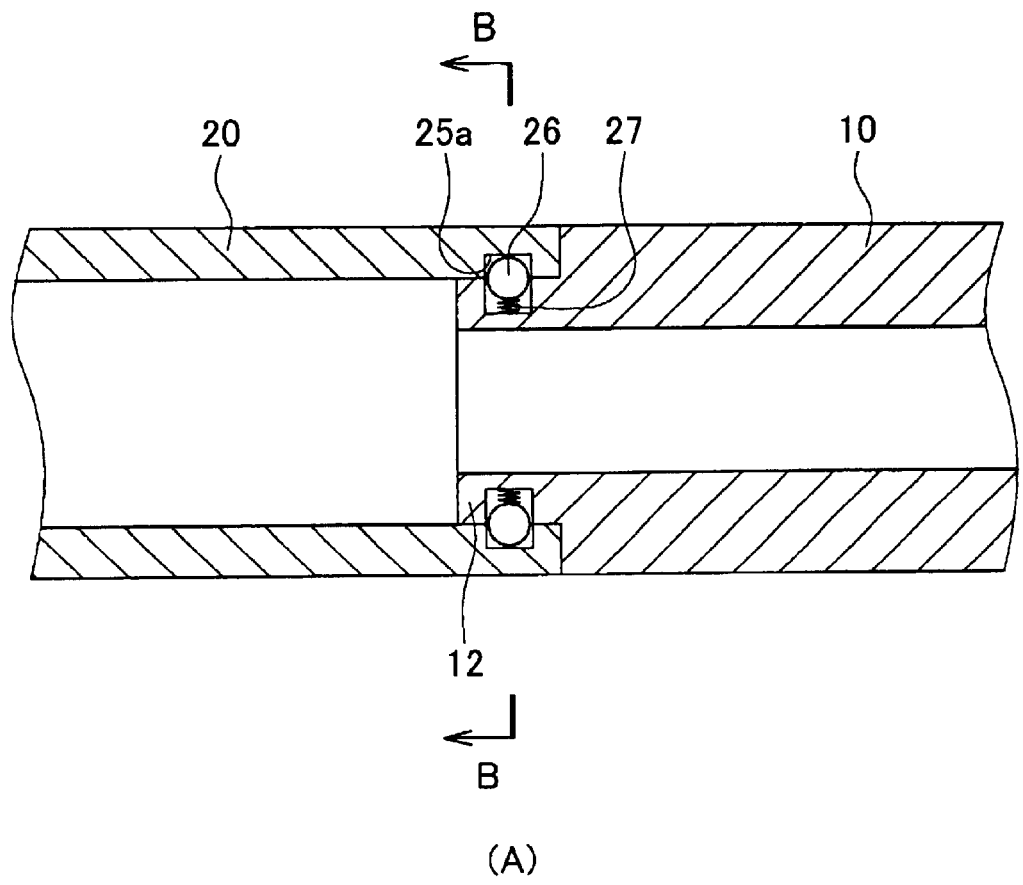
FIG. 3(A) is a schematic longitudinal sectional view of the connection between a first water pipe and a second water pipe of another embodiment of sprinkler of the present invention and FIG. 3(B) is a cross sectional view taken along the arrowed line B—B of FIG. 3(A)
Figure 3:
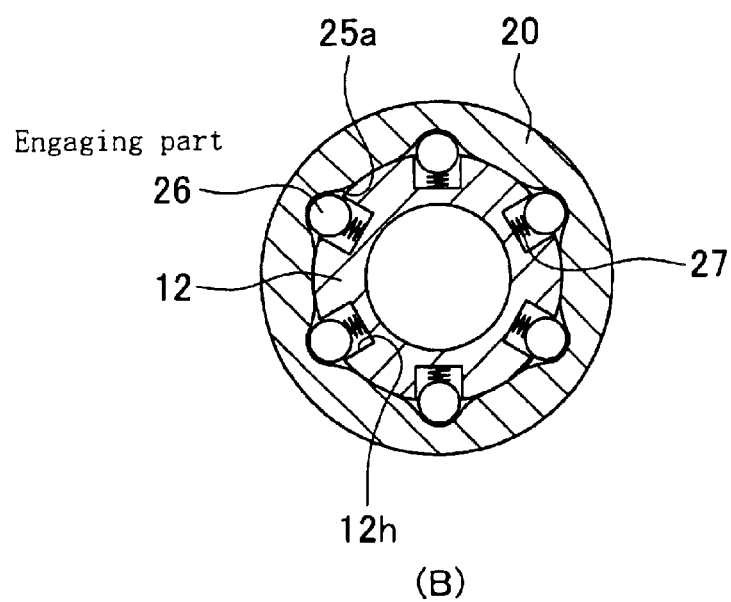

As shown in FIG. 3, the first water pipes 10 and the second water pipes 20 are prevented from turning relatively to each other by engaging parts 26 and engaging recesses 25a. In FIG. 3, the cramp 5 is not shown for the sake of simplicity and the easy understanding of the structure of the connection between the first water pipe 10 and the second water pipe 20.

Holes 12h are made in the periphery of each end portion 12 of each first water pipe 10, at regular angular intervals around the longitudinal center axis of said first water pipe 10. An engaging part 26 is held in each hole 12h so that a top portion of the engaging part 26 can go up beyond the top opening of said hole 12h, but the engaging part 26 cannot come entirely out of said hole 12h.

A pushing-up part 27 such as a spring is set between the bottom of each hole 12h and the engaging part 26 in said hole 12h. The pushing-up part 27 in each hole 12h pushes up the engaging part 26 so as to keep the part 26 in such a position as a top portion of the part 26 protrudes beyond the top opening of said hole 26. When the engaging parts 26 in the holes 12h of each end portion 12 of each first water pipe 10 are pressed down radially of said first water pipe 10, the pushing-up parts 27 yield to the pressing-down force and the engaging parts 26 moves toward the bottoms of the holes 12h.

On the other hand, engaging recesses 25a are made in the inner surface of each end portion of each second water pipe 20, at regular angular intervals around the longitudinal center axis of said second water pipe 20. Each recess in the inner surface of each end portion of each second water pipe 20 is continued, in the circumferential direction of the inner surface, smoothly to the inner surface. Its reason will be described later.

Accordingly, when one end of a first water pipe 10 is applied to one end of a second water pipe 20 for connection, the inner surface of the end portion of the second water pipe 20 presses down the engaging parts 26 of the end portion of the first water pipe 10; therefore, the pushing-up parts 27 yield to the pressing-down force and the engaging parts 26 in the holes 12h sink under the top openings of the holes 12h, allowing the end portion 12 of the first water pipe 10 to be inserted into the end portion of the second water pipe 20.

When the engaging parts 26 of the end portion of the first water pipe 10 come to the engaging recesses 25a of the end portion of the second water pipe 20, the pushing-up parts 27 push up the engaging parts 26 into the engaging recesses 25a. Thus, the engagement between the engaging parts 26 and the engaging recesses 25a is accomplished.

Accordingly, the first and second water pipes are prevented from turning relatively to each other while water is being sprinkled. Thus, the directions of the sprinkler heads 30 are not disturbed.

To redirect the sprinkler heads 30 of, for example, a first water pipes 10, the cramps 5 at both ends of the first water pipe 10 are loosened and turning torque around the longitudinal center axis of the first water pipe 10 is applied to it.

Because each engaging recess 25a of each end portion of each second water pipe 20 is continued, in the circumferential direction of the inner surface of said end portion, smoothly to the inner surface, each engaging part 26 moves smoothly from an engaging recess 25a to the next one 25a under relatively small turning torque. Accordingly, the first water pipe 10 can easily be turned around its longitudinal center axis. Thus, any water pipes 10 and 20 can easily be turned relatively to each other without disconnecting them from each other; therefore, the sprinkler heads 30 of any water pipes 10 and 20 can easily be redirected without disconnecting them.

Each sprinkler head 30 of each of the first and second water pipes 10 and 20 may be a simple through hole made in the wall of the said water pipe 10 or 20 or a through hole with a nozzle. However, sprinkler heads 30 of the configuration shown in FIG. 4 are suitable because their directions can be adjusted without turning first and second water pipes 10 and 20.

Figure 4:
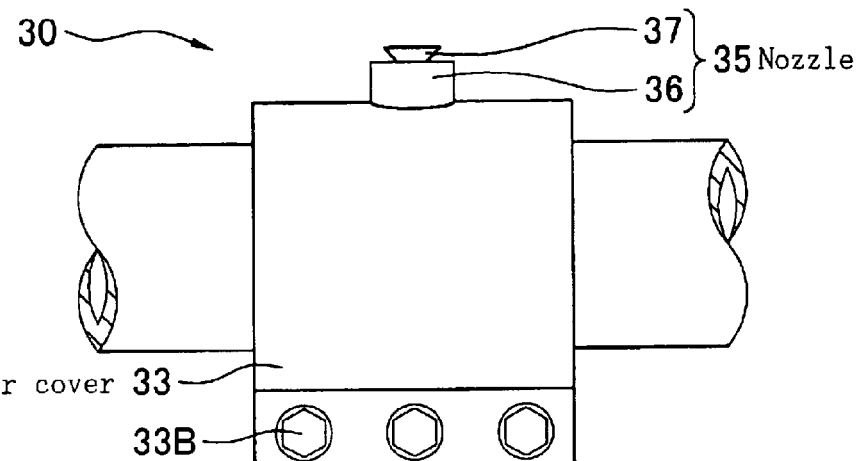
FIG. 4 is schematic illustrations of an embodiment of sprinkler head of the present invention.
Figure 4:
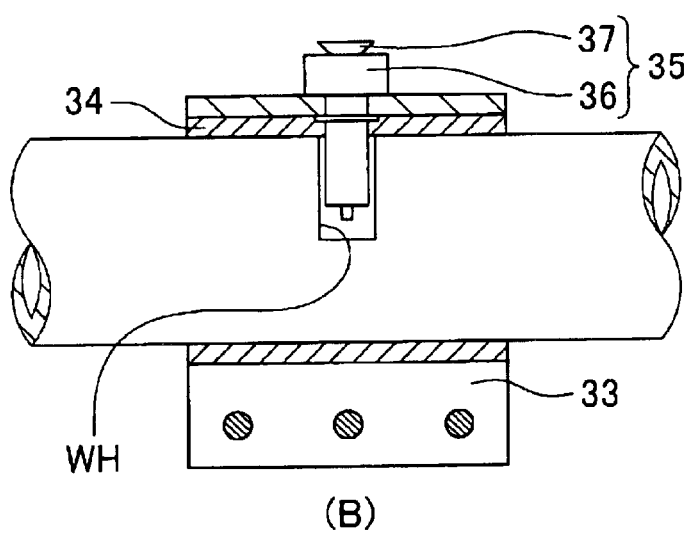
Figure 4:
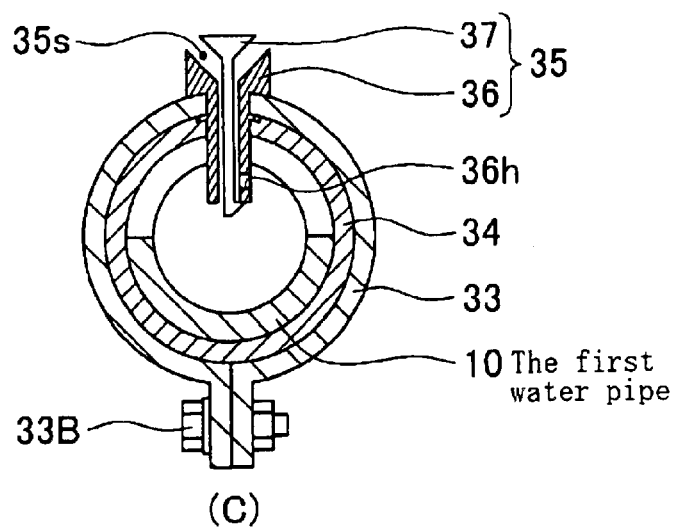

As shown in FIG. 4, a plurality of groove-like through wholes "WH" are made in the wall of each of the first and second water pipes 10 and 20, in the circumferential direction of said pipe, at appropriate places on said pipe.

Each groove-like through hole WH and a head unit constitute a sprinkler head 30. Each head unit comprises a nozzle 35 and an outer cover 33 with bolts 33B. The outer cover 33 of each sprinkler head 30 covers the groove-like through whole WH of said sprinkler head 30. When the bolts 33B of each outer cover 33 of each water pipe 10 or 20 are tightened, said outer cover 33 is fixed firmly to said water pipe 10 or 20. When the bolts 33B of each outer cover 33 of each water pipe 10 or 20 are loosened, said outer cover 33 can be turned in the circumferential direction of said water pipe 10 or 20.

Each nozzle 35 comprises a cylindrical part 36 and an axial part 37 inserted in the cylindrical part 36. The cylindrical part 36 of each sprinkler head 30 is inserted in the groove-like through whole WH of said sprinkler head 30. The head of the cylindrical part 36 of each sprinkler head 30 is funnel-shaped and fixed to the outer cover 33 of said sprinkler head 30. The inside and the outside of each water pipe 10 or 20 are connected by the through hall 36h of the cylindrical part 36 of each sprinkler head 30.

A gap is provided between the inner surface of the cylindrical part 36 and the outer surface of the axial part 37 of each nozzle 35 to let water through. A gap 35s is provided between the inner surface of the funnel-shaped head of the cylindrical part 36 and the bottom surface of the head of the axial part 37 of each nozzle 35, the head of the axial part 37 being in an upside-down conical shape.

Accordingly, water running through the pipeline consisting of the first and second water pipes 10 and 20 are sprinkled by the sprinkler heads 30 over both sides of the pipeline. Besides, because the heads of the cylindrical part 36 and the axial part 37 of each nozzle 35 are in the shapes of a funnel and an upside-down cone, respectively, water can be sprinkled not only in a lateral range relative to the pipeline but also in a longitudinal range relative to the pipeline.

To adjust the place to be sprinkled with water by a sprinkler head 30 of a water pipe 10 or 20, the bolts 33B are loosened and the outer cover 33 is turned in the circumferential direction of the water pipe 10 or 20 to move the nozzle 35 in and along the groove-like through whole WH. Thus, the nozzle 35 can be redirected.

Besides, because the outer covers 33 are very small as compared with the first and second water pipes 10 and 20, the redirection of nozzles 35 by turning outer covers 33 is easier by far than the same by turning first and second water pipes 10 and 20.

Moreover, because individual sprinkler heads 30 can be redirected independently, they can be put in optimal directions.

Figure 5:
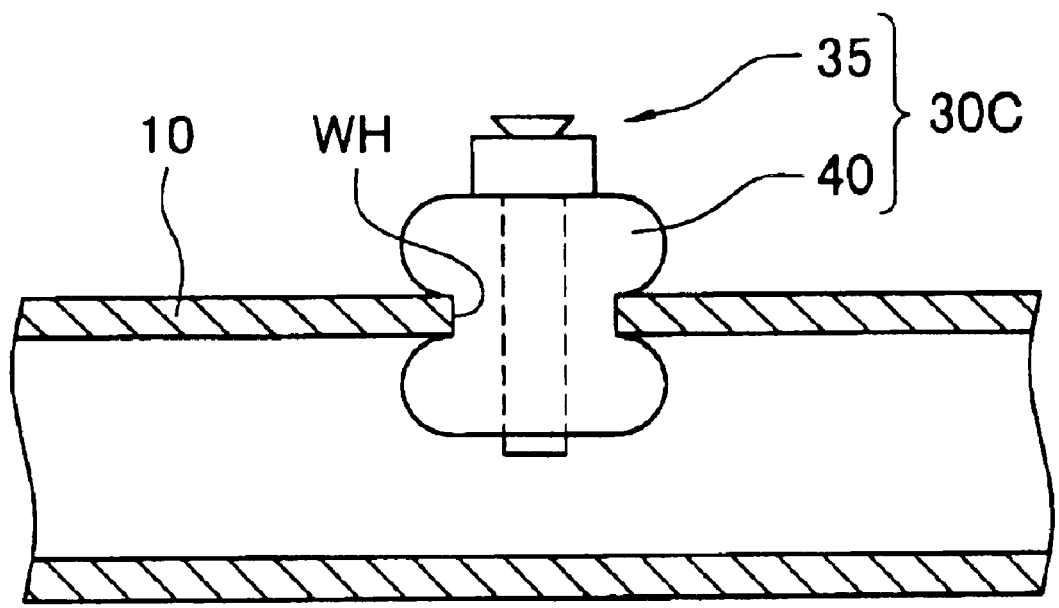
FIG. 5 is a schematic illustration of another embodiment of sprinkler head of the present invention.
Figure 6:
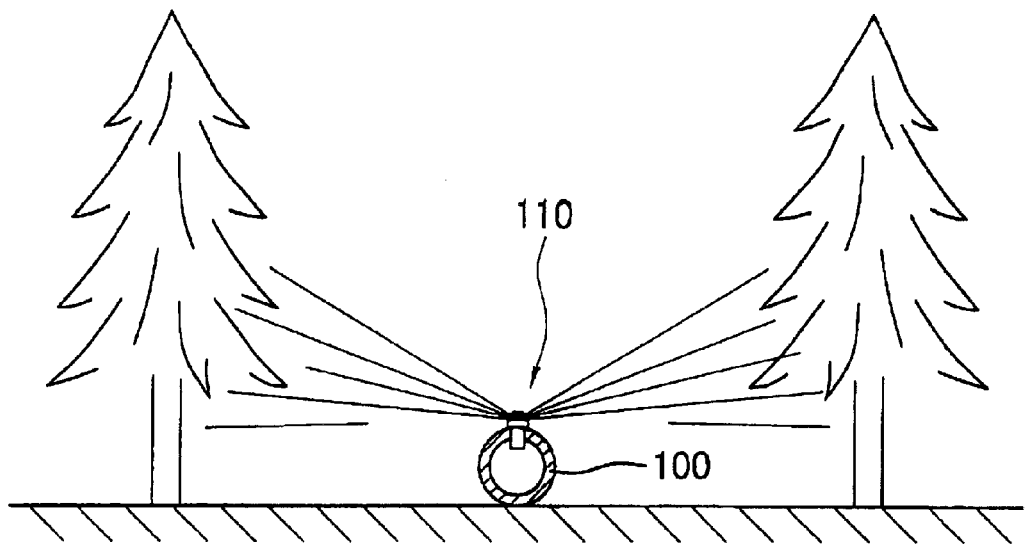
FIG. 6 is schematic illustrations of a conventional sprinkler.
Figure 6:
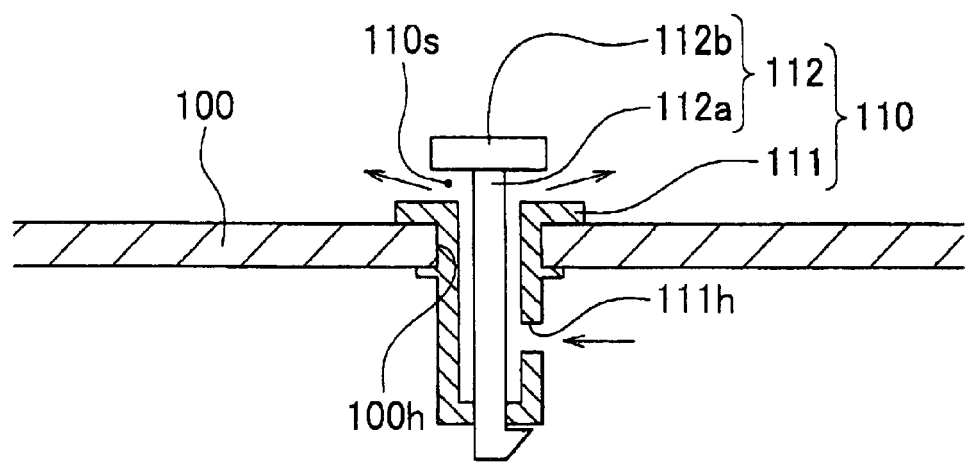

As shown in FIG. 5, each nozzle 35 may be set in a through hole "WH" with an holder 40 made of an elastic material. Because the holder 40 is elastic, said nozzle 35 can be put in any desired direction even if the through hole WH is a simple circular hole.

The engaging mechanisms between first water pipes 10 and second water pipes 20 of the above first and second embodiments can also be applied to bypass pipes for water service.

The invention may be embodied in other specific forms without departing from the spirit or essential characteristics thereof. The above embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A sprinkler to sprinkle water running in a pipeline over both its sides through sprinkler heads mounted on the pipeline, wherein:

the pipeline comprises first water pipes and second water pipes connected to each other alternately so as to be freely disconnectable and reconnectable;

both end portions of each first water pipe are formed so as to have outer diameter which is equal to the inner diameter of the second water pipes;

a plurality of first engaging protrusions are formed on the periphery of one end portion of each first water pipe, at regular angular intervals around the longitudinal center axis of said first water pipe; and a plurality of second engaging protrusions are formed at one end of each second water pipe so as to engage with the first engaging protrusions of the first water pipe when the end portion with first engaging protrusions of a first water pipe is inserted into the end with second engaging protrusions of said second water pipe, wherein:

each of the sprinkler heads of each of the first and second water pipes comprises (i) a groove-like through hole made in the wall of said water pipe, in the circumferential direction of said water pipe, at an appropriate place on said water pipe and (ii) a head unit to sprinkle the water in the pipeline;

the head unit of each sprinkler head of each of the first and second water pipes comprises (i) an outer cover which is fitted onto said water pipe to cover the groove-like through hole of said sprinkler head and slidable along the periphery of said water pipe, in the circumferential direction of said water pipe and (ii) a nozzle whose lower end is inserted in the groove-like through hole and whose upper end is fixed to the outer cover; and when water is allowed to run through the pipeline, the water is sprinkled from the upper ends of the nozzles.

2. A sprinkler as claimed in claim 1, wherein each first water pipe in the pipeline is movable along its longitudinal center axis and, when each first water pipe in the pipeline is moved toward the connection where the end portion without first engaging protrusions of said first water pipe is inserted into the end without second engaging protrusions of a second water pipe, the engagement between the first engaging protrusions of said first water pipe and the second engaging protrusions of a second water pipe at the other connection is broken.

3. A sprinkler to sprinkle water running in a pipeline over both its sides through sprinkler heads mounted on the pipeline, wherein:

the pipeline comprises first water pipes and second water pipes connected to each other alternately so as to be freely disconnectable and reconnectable;

both end portions of each first water pipe are formed so as to have outer diameter which is equal to the inner diameter of the second water pipes;

at least one end portion of each first water pipe is provided with a plurality of engaging parts which are disposed in the periphery of the end portion, at regular angular intervals around the longitudinal center axis of said first water pipe and free to protrude beyond and withdraw under the level of the outer surface of the end portion; and at least one end portion of each second water pipe is provided with engaging recesses in the inner surface of the end portion which engage with the engaging parts of a first water pipe, wherein:

each of the sprinkler heads of each of the first and second water pipes comprises (i) a groove-like through hole made in the wall of said water pipe, in the circumferential direction of said water pipe, at an appropriate place on said water pipe and (ii) a head unit to sprinkle the water in the pipeline:

the head unit of each sprinkler head of each of the first and second water pipes comprises (i) an outer cover which is fitted onto said water pipe to cover the groove-like through hole of said sprinkler head and slidable along the periphery of said water pipe, in the circumferential direction of said water pipe and (ii) a nozzle whose lower end is inserted in the groove-like through hole and whose upper end is fixed to the outer cover; and when water is allowed to run through the pipeline, the water is sprinkled from the upper ends of the nozzles.

4. A sprinkler as claimed in claim 3, wherein each engaging recess in the inner surface of said end portion of each second water pipe is continued, in the circumferential direction of the inner surface, smoothly to the inner surface.

* * * * *